United States Patent
Gayral Chirac

(10) Patent No.: US 9,945,182 B2
(45) Date of Patent: Apr. 17, 2018

(54) METHOD FOR DRILLING UNDERGROUND CAVITIES, COMPOSITIONS COMPRISING ALKYL POLYGLYCOSIDES, AND USE THEREOF AS A LUBRICANT IN THE PRODUCTION OF AQUEOUS DRILLING MUDS

(71) Applicant: SOCIETE D'EXPLOITATION DE PRODUITS POUR LES INDUSTRIES CHIMIQUES SEPPIC, Paris (FR)

(72) Inventor: Marie-Francoise Gayral Chirac, Viviers-les-Montagnes (FR)

(73) Assignee: SOCIETE D'EXPLOITATION DE PRODUITS POUR LES INDUSTRIES CHIMIQUES SEPPIC, Paris (FR)

( * ) Notice: Subject to any disclaimer, the term of this patent is extended or adjusted under 35 U.S.C. 154(b) by 190 days.

(21) Appl. No.: 14/428,039

(22) PCT Filed: Aug. 9, 2013

(86) PCT No.: PCT/FR2013/051919
§ 371 (c)(1),
(2) Date: Mar. 13, 2015

(87) PCT Pub. No.: WO2014/041268
PCT Pub. Date: Mar. 20, 2014

(65) Prior Publication Data
US 2015/0252622 A1     Sep. 10, 2015

(30) Foreign Application Priority Data
Sep. 14, 2012   (FR) ...................... 12 58648

(51) Int. Cl.
*E21B 7/00*   (2006.01)
*C09K 8/08*   (2006.01)
*E21B 21/00*  (2006.01)

(52) U.S. Cl.
CPC .............. *E21B 7/00* (2013.01); *C09K 8/08* (2013.01); *E21B 21/00* (2013.01); *C09K 2208/12* (2013.01); *C09K 2208/34* (2013.01)

(58) Field of Classification Search
CPC .. E21B 7/00; E21B 21/00; C09K 8/08; C09K 2208/12; C09K 2208/34
See application file for complete search history.

(56) References Cited

U.S. PATENT DOCUMENTS

| | | | | |
|---|---|---|---|---|
| 3,313,362 A | * | 4/1967 | Schneider | E21B 21/16 175/71 |
| 5,663,137 A | * | 9/1997 | Giesen | A61K 8/604 510/470 |
| 5,734,029 A | * | 3/1998 | Wulff | A61K 8/604 536/120 |
| 8,778,170 B2 | * | 7/2014 | Long | C10G 11/18 208/72 |
| 9,249,349 B2 | * | 2/2016 | Gayral Chirac | C09K 8/38 |
| 2008/0011486 A1 | * | 1/2008 | Zhang | C09K 8/38 166/308.6 |
| 2009/0288985 A1 | * | 11/2009 | Long | C10G 11/18 208/57 |
| 2013/0252853 A1 | * | 9/2013 | Gayral Chirac | C09K 8/38 507/102 |
| 2014/0275673 A1 | * | 9/2014 | Long | C10G 11/18 585/256 |

FOREIGN PATENT DOCUMENTS

| WO | 2003106584 A1 | 12/2003 | |
|---|---|---|---|
| WO | 2012085391 A1 | 6/2012 | |
| WO | WO 2012085391 A1 * | 6/2012 | ............... C09K 8/38 |

OTHER PUBLICATIONS

International Search Report, dated Feb. 5, 2014, from corresponding PCT application.
French Search Report, dated May 30, 2013, from corresponding French application.

* cited by examiner

*Primary Examiner* — Zakiya W Bates
*Assistant Examiner* — Crystal J Miller
(74) *Attorney, Agent, or Firm* — Young & Thompson

(57) ABSTRACT

A method for drilling cavities in underground formations in which drill cuttings are removed by injecting an aqueous composition (C) into the drill hole. Composition (C) includes between 1 and 65 wt. % salt(s), between 0.05 and 2 wt. % anti-foaming agent(s), between 13 and 97.95 wt. % water, and between 1 and 20 wt. % composition ($C_2$). Composition ($C_2$) includes, optionally, between 0.1 and 30 wt. % auxiliary agent(s), between 0 and 100 wt. % of a surfactant system of one or more compositions ($C_1$) according to $R_1$—O-($G_1$)p-H, $R_1$ being an aliphatic radical including between 4 and 16 carbon atoms, $G_1$ being a reducing sugar residue and $1.05 \leq p \leq 5$, and between 0 and 50 wt. % alcohol(s) according to $R_1$—OH, $R_1$ being an aliphatic radical including between 4 and 16 carbon atoms. Also, compositions ($C_2$) and their use as a lubricant for producing an aqueous drilling mud.

4 Claims, No Drawings

METHOD FOR DRILLING UNDERGROUND CAVITIES, COMPOSITIONS COMPRISING ALKYL POLYGLYCOSIDES, AND USE THEREOF AS A LUBRICANT IN THE PRODUCTION OF AQUEOUS DRILLING MUDS

The present invention relates to a process for drilling cavities in subterranean formations employing a stage of discharge of the drill cuttings by injection of aqueous fluids comprising salts and alkyl polyglycosides. The present invention also relates to novel compositions and to their uses as lubricant for preparing said aqueous fluids.

The technologies for drilling subterranean formations are employed for the prospecting and production stages in the activities of the oil and gas industries. In this technical field:
"prospecting" is understood to mean all the activities targeted at looking for and at discovering new oil and natural gas fields. These activities resort to exploratory drilling operations, in order to confirm the presence of hydrocarbons, and to appraisal drilling operations, which make it possible to estimate the economic viability of the exploitation of the field discovered;
"production" is understood to mean all the activities targeted at extracting the hydrocarbons from their underground reservoir and which comprise in particular operations for the drilling of wells.

The most widely used drilling techniques employ a fluid, referred to as "drilling fluid", which is a complex mixture of different liquid (water, oil) and/or gas (air or natural gas) components, generally being provided in the form of emulsions and/or suspensions comprising other inorganic and organic additives, such as, for example, clays, polymers, surfactants, cuttings and/or cements.

During the drilling operation, the drilling fluid is continuously circulated, both in the fracturing region of the rock and at the surface. It is prepared in mud tanks, it is then injected inside the pipes as far as the cutting tool and it rises again in the annular space laden with the cuttings formed at the working face. At the outlet of the well, the drilling fluid is subjected to various treatments, such as, for example, stages of sieving, diluting or adding chemical additives, with the aim of removing the transported cuttings and of readjusting its physicochemical characteristics to their initial values before it is reused. The drilling fluid has the roles:
of providing for the rise of the cuttings from the bottom of the well up to the surface, by circulation in the annular space of the cutting tool,
of keeping the cuttings in suspension during a possible halt to its circulation, in order to prevent them from sedimenting, which might damage the cutting tool when it is restarted,
of cooling and lubricating the cutting tool in order to prevent the rapid wear of the moving metal parts constituting it, and
of keeping the walls of the well in a stable state due to its density and due to the ability to form, on the wall, a barrier which limits the transfers of other fluids, originating from the rock formations traversed, towards the drilling annulus.

In addition, the drilling fluid must be:
noncorrosive and nonabrasive with regard to the drilling tools with which it is in contact,
nontoxic nor dangerous to the people who use it;
not dangerous to the environment.

Drilling fluids are either oil-based or water-based.

Oil-based drilling fluids are fluids, the continuous phase of which is a mineral oil (crude oil, fuel oil, gas oil, and the like) and the dispersed phase of which is water. Until recently, gas oil was the most frequently used continuous phase for preparing oil-based drilling fluids. Current environmental constraints require its replacement by mineral or synthetic oils devoid of aromatic compounds. Furthermore, these same constraints are accelerating the replacement of oil-based drilling fluids by aqueous drilling fluids.

Water-based drilling fluids, known as aqueous drilling fluids, are drilling fluids, the continuous phase of which is water, which, according to the conditions of use, can be fresh water, sea water, brines or their mixtures, and the dispersed phase of which is an oil and/or one or more solids of mineral nature. They also comprise a large amount of inorganic and/or organic salts and also various additives, the composition of which is capable of contributing, to the water-based drilling fluid, an additional amount of inorganic and/or organic salts.

However, these aqueous drilling fluids are not intrinsically lubricating. In order to prevent them bringing about premature wear of the drilling tool or its blocking, it is necessary to incorporate a lubricant, such as fatty substances, therein.

U.S. Pat. No. 5,837,655 thus discloses water-based drilling fluids comprising linear and/or branched and/or cyclic paraffins comprising from 8 to 28 carbon atoms.

The international application published under the number WO 2007/146067 A2 discloses the use of fatty phases comprising fatty acid monoalkyl esters, corresponding to the definition of "B100 biodiesel" according to the standard ASTM standard No. D6751-07a, for preparing aqueous drilling fluids so as to confer on them in particular lubricating properties.

The United States patent application number US 2005/0197255 A1 discloses the use of metal salts of fatty acids, such as, for example, stearic acid, as lubricant for preparing aqueous drilling fluids which can comprise brines.

The international application published under the number WO 00/29519 A1 discloses aqueous drilling fluids comprising, in order to improve their lubricating nature, a composition based on oils, on a nonionic surfactant, such as, for example, a polyalkoxylated glycol, on an ester and on a polypropylene glycol.

The U.S. Pat. No. 5,007,489 discloses aqueous drilling fluids comprising water or a brine, water-insoluble polyglycols with molecular weights of between 1200 and 10 000 g·mol$^{-1}$, at least one emulsifying agent and one hydrotropic agent.

However, the lubricants described above are insoluble or very slightly soluble in water and in brines, which makes it difficult to employ them in dispersion and which brings about phenomena of phase separation on storage of said aqueous drilling fluids.

In order to improve the dispersion of these fatty substances, used as lubricants for the preparation of water-based drilling fluids, use is preferably made of surfactants. The United States patent published under the number U.S. Pat. No. 5,807,811 thus discloses the use of fatty substances consisting of a mixture of triglycerides, of fatty carboxylic acids and of olefins in the presence of a phosphate ester and of an emulsifier derived from succinic acid, which is provided in the form of an emulsion of oil-in-water type, the stability on storage of which is limited over time.

The United States patent application published under the number US 2003/0232726 A1 discloses a process for drilling subterranean formations employing an aqueous drilling fluid comprising silicates and a lubricant comprising, as fatty substances, sparingly water-soluble alcohols, preferably chosen from the components of the group consisting of 2-octyldodecanol, oleyl alcohol, stearyl alcohol and polyether glycols (PEGs), and an alkyl polyglycoside, preferably chosen from the components of the group consisting of butyl glucoside, hexyl glucoside and 2-ethylhexyl glucoside. However, neither these compositions nor the aqueous drilling fluids comprising them are stable on storage as a phase separation is observed as soon as stirring of them is halted. There thus exists a need to have available a composition:

which remains homogeneous after a period of storage,
which shows outstanding lubricating properties,
which has properties of inhibiting the swelling of clays, as additive in aqueous drilling fluids.

This is why the invention has as subject matter a process for the drilling of cavities in subterranean formations, said process comprising a stage of discharge of the drilling cuttings from said subterranean formations by injection, into the drilling well, of an aqueous composition (C) comprising, per 100% of its weight:

from 1% to 65% by weight of at least one salt (S) consisting of at least one cation chosen from the ammonium ion and metal cations and at least one anion chosen from chloride, bromide, carbonate, bicarbonate, hydrogencarbonate, silicate, metasilicate, sulfate, hydrogensulfate, borate, tetraborate, dihydrogenborate, hydrogenborate or hydrogentetraborate ions or organic anions carrying a carboxylate functional group;

from 0.05% to 2% by weight of at least one antifoaming agent, from 13% to 97.95% by weight of water and from 1% to 20% by weight of a composition ($C_2$) comprising, per 100% of its weight:

optionally from 0.1% to 30% by weight of at least one auxiliary agent chosen from the components of the group consisting of erythritol, xylitol, sorbitol, sodium gluconate, glucose and maltodextrins;

from 50% to 100% by weight of a surfactant (Su) system consisting of a composition ($C_1$) or of a mixture of compositions ($C_1$), said composition ($C_1$) being represented by the formula (I):

$$R_1\text{—}O\text{-}(G_1)_p\text{-}H \quad (I)$$

in which $R_1$ represents a saturated or unsaturated and linear or branched aliphatic radical comprising from 4 to 16 carbon atoms, $G_1$ represents the residue of a reducing sugar and p represents a decimal number greater than or equal to 1.05 and less than or equal to 5, said composition ($C_1$) consisting of a mixture of compounds represented by the formulae ($I_1$), ($I_2$), ($I_3$), ($I_4$) and ($I_5$):

$$R_1\text{—}O\text{-}(G_1)_1\text{-}H \quad (I_1),$$

$$R_1\text{—}O\text{-}(G_1)_2\text{-}H \quad (I_2),$$

$$R_1\text{—}O\text{-}(G_1)_3\text{-}H \quad (I_3),$$

$$R_1\text{—}O\text{-}(G_1)_4\text{-}H \quad (I_4),$$

$$R_1\text{—}O\text{-}(G_1)_5\text{-}H \quad (I_5),$$

in the respective molar proportions $a_1$, $a_2$, $a_3$, $a_4$ and $a_5$ such that the sum:
$a_1+a_2+a_3+a_4+a_5$ is equal to 1 and the sum $a_1+2a_2+3a_3+4a_4+5a_5$ is equal to p;

and from 0% to 50% by weight of at least one alcohol of formula (II):

$$R_1\text{—}OH \quad (II)$$

in which $R_1$ represents a saturated or unsaturated and linear or branched aliphatic radical comprising from 4 to 16 carbon atoms.

In the process as defined above, the aqueous composition (C) is generally prepared prior to its use and then stored in tanks before being injected at the well head through a system of pipes and drill collars. The composition (C) subsequently emerges from the end of the drilling pipe in order to fall to the bottom of the well, where the bit drills the rock formation, and then comes back up to the surface via the annular space included between the drilling pipe and the walls of the well, carrying along the pieces of rocks from the subterranean formation, known as "cuttings", which were torn off by the drilling tool. The cuttings are subsequently separated from the composition (C) in order to be discharged.

According to a specific aspect of the process as defined above, the aqueous composition (C) comprises, per 100% of its weight:

from 1% to 50% by weight of at least one salt (S) as defined above, from 0.1% to 2% by weight of at least one antifoaming agent, from 39.9% to 97.9% by weight of water and from 1% to 10% by weight of a composition ($C_2$) as defined above.

According to a more specific aspect of the process as defined above, the aqueous composition (C) comprises, per 100% of its weight:

from 5% to 40% by weight of at least one salt (S) as defined above, from 0.1% to 2% by weight of at least one antifoaming agent, from 53% to 93.9% by weight of water, from 1% to 5% by weight of a composition ($C_2$) as defined above.

According to a specific aspect of the process as defined above, said composition ($C_2$) comprises, per 100% of its weight:

a proportion by weight of said surfactant (Su) system of greater than or equal to 90% and less than 100%, and a proportion by weight of said alcohol of formula (II) of greater than 0% and less than or equal to 10%.

According to a more specific aspect of the process as defined above, the composition ($C_2$) comprises, per 100% of its weight:

a proportion by weight of said surfactant (Su) system of greater than or equal to 95% and less than 100% and a proportion by weight of said alcohol of formula (II) of greater than 0% and less than or equal to 5%.

According to another more specific aspect of the process as defined above, the composition ($C_2$) comprises, per 100% of its weight:

a proportion by weight of said surfactant (Su) system of greater than or equal to 98% and less than 100% and a proportion by weight of said alcohol of formula (II) of greater than 0% and less than or equal to 2%.

Reducing sugar denotes, in the definition of the composition ($C_1$) represented by the formula (I), saccharide derivatives without a glycoside bond established between an anomeric carbon and the oxygen of an acetal group, such as are defined in the reference work: "*Biochemistry*", Daniel Voet/Judith G. Voet, p. 250, John Wiley & Sons, 1990.

The oligomeric structure $(G_1)_p$ can be provided in all forms of isomerisms, whether optical isomerism, geometric isomerism or position isomerism; it can also represent a mixture of isomers.

In the formula (I) as defined above, the $R_1$ group is bonded to $G_1$ via the anomeric carbon of the saccharide residue, so as to form an acetal functional group.

According to a specific aspect of the process as defined above, in the formula (I), $G_1$ represents the residue of a reducing sugar chosen from the residues of glucose, dextrose, sucrose, fructose, idose, gulose, galactose, maltose, isomaltose, maltotriose, lactose, cellobiose, mannose, ribose, xylose, arabinose, lyxose, allose, altrose, dextrin or tallose.

According to a more specific aspect of the process as defined above, in the formula (I), $G_1$ represents the residue of a reducing sugar chosen from the residues of glucose, xylose and arabinose.

According to another more specific aspect of the process, in the formula (I), p represents a decimal number greater than or equal to 1.05 and less than or equal to 2.5, more particularly greater than or equal to 1.05 and less than or equal to 2.0 and more particularly still greater than or equal to 1.25 and less than or equal to 2.0.

In the process as defined above and which is a subject matter of the invention, saturated or unsaturated and linear or branched aliphatic radical comprising from 4 to 16 carbon atoms more particularly denotes $R_1$ in the formulae (I) and (II) as defined above:
- a linear alkyl radical, for example the butyl (n-$C_4H_9$—), hexyl (n-$C_6H_{13}$—), heptyl (n-$C_7H_{15}$—), octyl (n-$C_8H_{17}$—), decyl (n-$C_{10}H_{21}$—), dodecyl (n-$C_{12}H_{25}$—), tetradecyl (n-$C_{14}H_{29}$—) or n-hexadecyl (n-$C_{16}H_{32}$—) radical;
- a branched alkyl radical resulting from isoalkanols of formula (1):

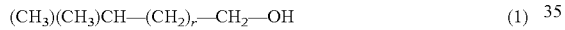

$$(CH_3)(CH_3)CH-(CH_2)_r-CH_2-OH \quad (1)$$

in which r represents an integer of between 0 and 12, for example the isooctyl, isononyl, isodecyl, isoundecyl, isododecyl, isotridecyl or isotetradecyl radical;
the 2-ethylhexyl ($C_4H_9$—CH($C_2H_5$)—$CH_2$—) radical or a branched alkyl radical resulting from a Guerbet alcohol of formula (2):

$$CH(C_sH_{2s+1})(C_tH_{2t+1})-CH_2-OH \quad (2)$$

in which t is an integer of between 2 and 12, s is an integer of between 2 and 12 and the sum s+t is greater than or equal to 4 and less than or equal to 14, for example the 2-ethyldecyl, 2-butyloctyl, 2-ethyldodecyl, 2-butyldecyl, 2-hexyloctyl, 2-butyldecyl, 2-hexyldecyl or 2-butyldecyl radical, or a radical resulting from a homolog of a Guerbet alcohol, for example the 2-propylheptyl radical;
a linear alkenyl radical, such as the undecenyl, dodecenyl or tetradecenyl radical, more particularly the 10-undecenyl, 4-dodecenyl or 5-dodecenyl radical.

According to a specific aspect of the process as defined above, in the formulae (I) and (II), $R_1$ represents an alkyl radical chosen from the butyl (n-$C_4H_9$—), hexyl (n-$C_6H_{13}$—), heptyl (n-$C_7H_{15}$—), 2-ethylhexyl [$C_4H_9$—CH($C_2H_5$)—$CH_2$—], octyl (n-$C_8H_{17}$—), decyl (n-$C_{10}H_{21}$—), dodecyl (n-$C_{12}H_{25}$—), tetradecyl (n-$C_{14}H_{29}$—) or hexadecyl (n-$C_{16}H_{32}$—) radicals.

According to a specific aspect of the process as defined above, said surfactant (Su) system consists, for 100% of its weight, of a mixture:
- of 70% to 95% by weight of a composition ($C_1$) represented by the formula (I) in which $R_1$ represents the decyl radical,
- of 2.5% to 20% by weight of a composition ($C_1$) represented by the formula (I) in which $R_1$ represents the dodecyl radical, and
- of 2.5% to 10% by weight of a composition ($C_1$) represented by the formula (I) in which $R_1$ represents the tetradecyl radical.

According to another specific aspect of the process as defined above, said surfactant (Su) system consists, for 100% of its weight, of a mixture:
- of 25% to 78% by weight of a composition ($C_1$) represented by the formula (I) in which $R_1$ represents the heptyl radical,
- of 20% to 50% by weight of a composition ($C_1$) represented by the formula (I) in which $R_1$ represents the decyl radical,
- of 1% to 15% by weight of a composition ($C_1$) represented by the formula (I) in which $R_1$ represents the dodecyl radical, and
- of 1% to 10% by weight of a composition ($C_1$) represented by the formula (I) in which $R_1$ represents the tetradecyl radical.

According to another specific aspect of the process as defined above, said surfactant (Su) system consists, for 100% of its weight, of a mixture:
- of 25% to 78% by weight of a composition ($C_1$) represented by the formula (I) in which $R_1$ represents the 2-ethylhexyl radical,
- of 20% to 50% by weight of a composition ($C_1$) represented by the formula (I) in which $R_1$ represents the decyl radical,
- of 1% to 15% by weight of a composition ($C_1$) represented by the formula (I) in which $R_1$ represents the dodecyl radical, and
- of 1% to 10% by weight of a composition ($C_1$) represented by the formula (I) in which $R_1$ represents the tetradecyl radical.

Maltodextrins denotes, in the definition of the auxiliary agents optionally present in the composition ($C_2$), the products resulting from the hydrolysis of a starch composed of different sugars bonded to one another via covalent bonds, such as, for example, glucose, maltose or maltotriose, and in relative proportions which depend on the degree of hydrolysis of the starch. This degree is measured and expressed in dextrose equivalent or D.E. (the dextrose being D-glucose). The higher this D.E., the greater the hydrolysis and the greater the proportion of singular sugars making up the maltodextrin. In the context of the specific aspect of the process which is a subject matter of the present invention, the preferred maltodextrins are maltodextrins characterized by a D.E. of greater than or equal to 2 and less than or equal to 20.

According to an even more specific aspect of the process as defined above, the auxiliary agent optionally included in the composition ($C_2$) is sorbitol.

The aqueous composition (C) employed in the process which is a subject matter of the present invention optionally comprises ingredients generally employed in the field of drilling processes, such as solvents, rheology modifiers, agents which inhibit the swelling of clays intended to inhibit the swelling of clays on contact with water, lubricants, filtrate-reducing agents, the role of which consists in limiting the inflows of other fluids, such as inflows of water, originating from the rock formations traversed, to the drilling annulus, weighting agents, which have the role of providing the drilling fluid with a suitable density, plugging agents or gas hydrate inhibitors.

Mention may be made, as examples of solvents optionally present in the composition (C) employed in the process which is a subject matter of the present invention, for example, of glycerol, dipropylene glycol, hexylene glycol, 1,2-propanediol, 1,3-propylene glycol, monopropylene glycol, DMSO or liquid polysaccharides.

Mention may be made, as examples of rheology modifiers optionally present in the composition (C) employed in the process which is a subject matter of the present invention, of:
- polymeric hydrocolloids of plant or biosynthetic origin, such as xanthan gum, gum karaya, carrageenates, alginates, galactomannans, cellulose and its derivatives, or starch and its hydrophilic derivatives;
- synthetic homopolymers prepared from acrylic acid and/or from its derivatives, from acrylamide and/or from its derivatives, from methacrylic acid and/or from its derivatives, from vinyl alcohol and/or its derivatives, or from 2-acrylamido-2-methylpropane-sulfonate acid;
- crosslinked synthetic anionic copolymers based on methacrylic acid or on acrylic acid, or on esters of methacrylic acid or of acrylic acid, optionally hydrophobically modified, prepared by direct emulsion polymerization. These synthetic anionic copolymers are respectively known to a person skilled in the art under the names "Alkaline Swellable Emulsion" (or "ASE") and "Hydrophobically Alkaline Swellable Emulsion" (or "RASE"). Thickening agents of "RASE" type are described in the international application published on 2 May 2002 under the number WO 02/347923 A2;
- synthetic, crosslinked or branched, anionic polyelectrolytes which are crosslinked and/or branched homopolymers or copolymers of water-soluble unsaturated monomers, such as acrylic acid and/or its derivatives, methacrylic acid and/or its derivatives, acrylamide and/or its derivatives, 2-acrylamido-2-methylpropane-sulfonate acid, or vinyl alcohol and/or its derivatives. These synthetic, crosslinked or branched, anionic polyelectrolytes are provided in the form of inverse latexes, obtained by inverse emulsion radical polymerization, or in the form of powders, obtained by precipitation polymerization or by atomization of inverse latexes;
- inorganic thickening agents, such as clays, montmorillonite (or bentonite), volkonskoite, smectite, nontronite, beidellite, hectorite, saponite, sauconite or vermiculite.

Mention may be made, as examples of agents which inhibit the swelling of clays optionally present in the composition (C) employed in the process which is a subject matter of the present invention, of polyethylene glycols with molecular weights of between 400 g·mol$^{-1}$ and 10 000 g·mol$^{-1}$, polyglycerols or alkoxylated alcohols, more particularly the alkoxylated alcohols comprising from 3 to 6 carbon atoms, such as, for example, ethoxylated butanol sold by Uniqema under the trade name Kemelix™ 7423X or the ethoxylated and propoxylated butanol sold by Uniqema under the trade name Kemelix™ UG20WAN.

Mention may be made, as examples of filtrate-reducing agents optionally present in the composition (C) employed in the process which is a subject matter of the present invention, of starches, carboxymethylcelluloses or polyanionic celluloses (PACs).

Mention may be made, as examples of weighting agents optionally present in the composition (C) employed in the process which is a subject matter of the present invention, of barium sulfate (or "barite") or calcium carbonate (or "calcite").

Mention may be made, as examples of lubricants optionally present in the composition (C) employed in the process which is a subject matter of the present invention, of alkoxylated fatty acids comprising from 12 to 24 carbon atoms, such as, for example, rapeseed oils ethoxylated with from 3 to 50 mol of ethylene oxide, methyl esters of ethoxylated fatty acids, or salts of fatty acids, such as, for example, sodium stearate.

Mention may be made, as examples of gas hydrate inhibitors optionally present in the composition (C) employed in the process which is a subject matter of the present invention, of copolymers based on vinylpyrrolidone, alcohols, such as methanol, or salts, such as, for example, quaternary ammonium salts.

The composition $(C_1)$ represented by the formula (I) as defined above is prepared by the process comprising:
- a stage a) of reaction, with mechanical stirring, of a reducing sugar with an excess of alcohol of formula (II) as defined above or of a mixture of alcohols of formula (II), generally in the presence of an acidic catalytic system, the stoichiometric ratio between the two reactants being controlled, under predetermined conditions of temperature and of partial vacuum, for example at a temperature between 70° C. and 130° C. and under a partial vacuum of between 300 mbar (3·10$^4$ Pa) and 20 mbar (2·10$^3$ Pa), in order to form a mixture of compounds represented by the formulae $(I_1)$, $(I_2)$, $(I_3)$, $(I_4)$ and $(I_5)$ as defined above and optionally of an excess of alcohol of formula (II) or of the mixture of alcohols of formula (II), if necessary or if desired;
- a stage b) of removal of the alcohol of formula (II) or of the mixture of alcohols of formula (II) which has/have not reacted during stage a), if necessary or if desired.

Such a preparation process can be supplemented, if necessary or if desired, by neutralization, filtration and decoloration operations.

Acidic catalytic system denotes, in stage a) of the process defined above, strong acids, such as sulfuric acid, hydrochloric acid, phosphoric acid, nitric acid, methanesulfonic acid, para-toluenesulfonic acid, trifluoromethanesulfonic acid or ion-exchange resins.

During stage b) of the process as defined above, the alcohol of formula (II) or the mixture of alcohols of formula (II) is removed according to methods known to a person skilled in the art, such as, for example, by distillation, such as thin film distillation or molecular distillation, or extraction by solvents.

A first method of preparation of said composition $(C_2)$ as defined above consists in mixing the composition $(C_1)$ or a mixture of compositions $(C_1)$ and an alcohol of formula (II) as defined above or a mixture of alcohols of formula (II) according to a controlled ratio by weight and under temperature conditions which make it possible to ensure the homogeneity of the mixture.

A second method of preparation of said composition $(C_2)$ as defined above consists in carrying out stage a) of the process for the preparation of said composition $(C_1)$ as defined above and then, if necessary, a stage b1) which consists in partially distilling, according to methods known to a person skilled in the art, the alcohol of formula (II) or the mixture of alcohols of formula (II) which has/have not reacted, is carried out on conclusion of stage a), so as to achieve the contents by weight of composition $(C_1)$ and of alcohol of formula (II) or of a mixture of alcohols of formula (II) desired in the composition $(C_2)$. Alternatively, this second method of preparation of said composition $(C_2)$ can comprise a stage b2) which consists in adding, with stirring, a predetermined proportion by weight of an alcohol of formula (II) or of a mixture of alcohols of formula (II) to the reaction mixture obtained on conclusion of stage a), so as to achieve the desired contents by weight of composition ($C_1$) and of alcohol of formula (II) or of a mixture of alcohols of formula (II) desired in the composition ($C_2$).

According to a specific aspect of the process as defined above, said composition ($C_2$) comprises, per 100% of its weight:
from 0.1% to 30% by weight of at least one auxiliary agent chosen from the components of the group consisting of erythritol, xylitol, sorbitol, sodium gluconate, glucose and maltodextrins;
from 35% to 99.9% by weight of said surfactant (Su); and
from 0% to 35% by weight of at least one alcohol of formula (II).

According to a more specific aspect of the process as defined above and which is a subject matter of the invention, the composition ($C_2$) comprises, per 100% of its weight:
from 65% to 99.9% by weight of a surfactant (Su) system consisting of a composition ($C_1$) or a mixture of compositions ($C_1$),
from 0% to 5% by weight of at least one alcohol of formula (II),
from 0.1% to 30% by weight of at least one auxiliary agent chosen from the components of the group consisting of erythritol, xylitol, sorbitol, sodium gluconate, glucose and maltodextrins.

According to another specific aspect of the process as defined above, the salt (S) is a salt chosen from sodium, potassium, calcium, zinc or cesium salts.

According to another specific aspect of the process as defined above, the salt (S) is chosen from salts of formic, acetic or propanoic acids and more particularly a salt of formic acid. It is very particularly cesium formate.

According to another specific aspect of the process as defined above, the salt (S) is chosen from sodium chloride, potassium chloride, calcium chloride, potassium carbonate, calcium bromide, zinc bromide, sodium silicate, sodium metasilicate or sodium tetraborate.

In the process as defined above and which is a subject matter of the invention, the antifoaming agent present in the aqueous composition (C) is selected from the antifoaming agents known to a person skilled in the art and more particularly from:
saturated or unsaturated and linear or branched fatty alcohols comprising from 8 to 32 carbon atoms and more particularly saturated or unsaturated and linear or branched fatty alcohols comprising from 8 to 22 carbon atoms,
block copolymers of ethylene oxide and propylene oxide and very particularly the block copolymers of ethylene oxide and of propylene oxide sold under the Pluronic™ trade name by BASF, for example Pluronic™ PE 6100 and Pluronic™ PE 6200,
nonionic surfactants of formula ($A_1$):

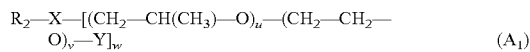
(A₁)

in which:
$R_2$ represents a saturated or unsaturated and linear or branched aliphatic radical comprising from 6 to 18 carbon atoms,
X represents a nitrogen atom or an oxygen atom,
v represents an integer of between 1 and 50,
u represents an integer of between 1 and 50,
w represents an integer equal to 1 if X represents an oxygen atom and w represents an integer equal to 1 or 2 if X represents a nitrogen atom,
Y represents a blocking functional group chosen from the components of the group consisting of linear alkyl radicals comprising from 4 to 8 carbon atoms, such as, for example, the butyl radical or the benzyl radical, or a butylene oxide group.

Mention may be made, among the nonionic surfactants of formula ($A_1$), of the products sold under the Tergitol™ trade name by Dow Chemical, such as, for example Tergitol™ L61E and Tergitol™ L64E, and the products sold under the Plurafac™ trade name by BASF, such as, for example, Plurafac™ LF 220 and Plurafac™ LF 221,
derivatives of silicone oils, more particularly polymethylsiloxanes and polysiloxanes modified by polyethers,
esters of linear fatty acids, originating from vegetable oils and comprising from 12 to 22 carbon atoms, and of short chain alcohols comprising from 1 to 4 carbon atoms, methyl laurate, methyl myristate, methyl palmitate, methyl stearate, methyl oleate, methyl linoleate, methyl linolenate, methyl arachidate, methyl behenate, methyl erucate or their mixtures, for example the products sold under the Estisol™ trade name by Estichem, such as Estisol™ 240.

Another subject matter of the invention is a composition ($C_{21}$) comprising, per 100% of its weight:
from 5% to 100% by weight of a mixture ($M_1$) consisting of, per 100% of its weight:
from 25% to 78% by weight of a composition ($C_1$) represented by the formula (I) in which $R_1$ represents the heptyl radical or the 2-ethylhexyl radical,
from 20% to 50% by weight of a composition ($C_1$) represented by the formula (I) in which $R_1$ represents the decyl radical,
from 1% to 15% by weight of a composition ($C_1$) represented by the formula (I) in which $R_1$ represents the dodecyl radical, and
from 1% to 10% by weight of a composition ($C_1$) represented by the formula (I) in which $R_1$ represents the tetradecyl radical,
from 0% to 95% by weight of water.

According to a more specific aspect, the aqueous composition ($C_{21}$) which is a subject matter of the present invention comprises, per 100% of its weight:
from 40% to 100% by weight of said mixture ($M_1$),
from 0% to 60% by weight of water.

According to another more specific aspect, the composition ($C_{21}$) as defined above additionally comprises, per 100% of its weight, from 0.1% to 30% by weight, more particularly from 0.1% to 20% by weight, of at least one auxiliary agent chosen from erythritol, xylitol, sorbitol, sodium gluconate, glucose and maltodextrins.

Maltodextrins denotes the products resulting from the hydrolysis of a starch as are defined above and more particularly the maltodextrins which are characterized by a D.E. of greater than or equal to 2 and less than or equal to 20.

According to another more specific aspect, the auxiliary agent included in the composition ($C_{21}$) is sorbitol.

Another subject matter of the invention is the use of the composition ($C_{21}$) as defined above as lubricant for preparing an aqueous composition (C), said composition (C) comprising, per 100% of its weight:
from 1% to 65% by weight of at least one salt (S) consisting of at least one cation chosen from the ammonium ion and metal cations and at least one anion chosen from chloride, bromide, carbonate, bicarbonate, hydrogencarbonate, silicate, metasilicate, sulfate, hydrogensulfate, borate, tetraborate, dihydrogenborate, hydrogenborate or hydrogentetraborate ions or organic anions carrying a carboxylate functional group;

from 0.05% to 2% by weight of at least one antifoaming agent, from 13% to 97.95% by weight of water and from 1% to 20% by weight of said composition ($C_{21}$);

and more particularly the use as defined above for which, in said composition (C), the salt (S) is chosen from sodium chloride, potassium chloride, calcium chloride, potassium carbonate, calcium bromide, zinc bromide, sodium silicate, sodium metasilicate or sodium tetraborate.

Finally, a subject matter of the invention is a process for drilling cavities in subterranean formations, said process comprising a stage of discharge of the drilling cuttings from said subterranean formations by injection, into the drilling well, of an aqueous composition (C) comprising, per 100% of its weight:

from 1% to 65% by weight of at least one salt (S) consisting of at least one cation chosen from the ammonium ion and metal cations and at least one anion chosen from chloride, bromide, carbonate, bicarbonate, hydrogencarbonate, silicate, metasilicate, sulfate, hydrogensulfate, borate, tetraborate, dihydrogenborate, hydrogenborate or hydrogentetraborate ions or organic anions carrying a carboxylate functional group;

from 0.05% to 2% by weight of at least one antifoaming agent, from 13% to 97.95% by weight of water and from 1% to 20% by weight of said composition ($C_{21}$) as defined above.

The following examples illustrate the invention without, however, limiting it.

A—PREPARATION OF COMPOSITIONS ($C_2$)

A-1) Composition ($C_2$) Comprising n-Heptyl Polyglucoside 2.7 molar equivalents of n-heptanol are introduced, with stirring, into a reactor maintained at 40° C. A molar equivalent of anhydrous glucose is subsequently added thereto, followed by 0.15% by weight of 98% sulfuric acid per 100% by weight of the mixture. The reaction medium is placed under a partial vacuum of approximately $0.18 \times 10^5$ Pa (180 mbar) and maintained at 100° C.-105° C. for 4 hours with distillation of the water formed. After cooling to 85° C.-90° C. and neutralizing by addition of 40% sodium hydroxide solution, so that the pH of a 5% solution of this mixture is equal to 7.0, the reaction medium thus obtained is emptied at 70° C. and filtered in order to remove the grains of unreacted glucose. The filtrate is subsequently introduced into another reactor. The excess heptanol is then distilled under partial vacuum and then the residue is diluted in water in order to obtain a 60% by weight solution. After stirring at 50° C. for 30 minutes, the composition obtained, named hereinafter ($X_0$), comprising 40% of water and 60% of n-heptyl polyglucoside, is emptied.

A-2) Composition ($C_2$) Comprising n-Decyl Polyglucoside, n-Dodecyl Polyglucoside and n-Tetradecyl Polyglucoside 4.0 molar equivalents of a mixture ($N_1$) consisting, for 100% of its weight, of 85% by weight of n-decanol, of 10% by weight of n-dodecanol and of 5% by weight of n-tetradecanol are introduced, with stirring, into a reactor maintained at 80° C. A molar equivalent of anhydrous glucose is subsequently added thereto, followed by 0.15% by weight of 98% sulfuric acid per 100% by weight of the mixture. The reaction medium is placed under a partial vacuum of approximately $0.18 \times 10^5$ Pa (180 mbar) and maintained at 100° C.-105° C. for 4 hours with distillation of the water formed. After cooling to 85° C.-90° C. and neutralizing by addition of 40% sodium hydroxide solution, so that the pH of a 5% solution of this mixture is equal to 7.0, the reaction medium thus obtained is emptied at 70° C. and filtered in order to remove the grains of unreacted glucose. The filtrate is subsequently introduced into another reactor. The excess mixture of alcohol ($N_1$) is subsequently removed by distillation using a thin film evaporator and then the residue is diluted in water in order to obtain a 55% by weight solution. After stirring at 50° C. for 30 minutes, the composition obtained, named hereinafter ($X_1$), comprising 45% of water and 55% of the mixture of n-decyl polyglucoside, n-dodecyl polyglucoside and n-tetradecyl polyglucoside is emptied.

A-3) Composition ($C_2$) Comprising 2-Ethylhexyl Polyglucoside 4.0 molar equivalents of 2-ethyl-1-hexanol are introduced with stirring into a reactor maintained at 80° C. A molar equivalent of anhydrous glucose is subsequently added thereto, followed by 0.15% by weight of 98% sulfuric acid per 100% by weight of the mixture. The reaction medium is placed under a partial vacuum of approximately $0.18 \times 10^5$ Pa (180 mbar) and maintained at 100° C.-105° C. for 4 hours with distillation of the water formed. After cooling to 85° C.-90° C. and neutralizing by addition of 40% sodium hydroxide solution, so that the pH of a 5% solution of this mixture is equal to 7.0, the reaction medium thus obtained is emptied at 70° C. and filtered in order to remove the grains of unreacted glucose. The filtrate is subsequently introduced into another reactor. The excess 2-ethyl-1-hexanol is subsequently removed by distillation using a thin film evaporator and then the residue is diluted in water in order to obtain a 55% by weight solution. After stirring at 50° C. for 30 minutes, the composition obtained, named hereinafter ($X_2$), comprising 45% of water and 55% of 2-ethylhexyl polyglucoside, is emptied.

A-4) Composition ($C_2$) Comprising n-Heptyl Polyglucoside, n-Decyl Polyglucoside, n-Dodecyl Polyglucoside and n-Tetradecyl Polyglucoside 100 grams of the composition ($X_0$) and 109.1 grams of the composition ($X_1$) are introduced into a reactor maintained at 40° C. The mixture is stirred for 30 minutes and then the composition obtained, denoted hereinafter ($X_3$), is emptied.

A-5) Composition ($C_2$) Comprising 2-Ethylhexyl Polyglucoside, n-Decyl Polyglucoside, n-Dodecyl Polyglucoside and n-Tetradecyl Polyglucoside 100 grams of the composition ($X_2$) and 100 grams of the composition ($X_1$) are introduced into a reactor maintained at 40° C. The mixture is stirred for 30 minutes and then the composition obtained, denoted hereinafter ($X_4$), is emptied.

A-6) Composition ($C_2$) Comprising n-Heptyl Polyglucoside, n-Decyl Polyglucoside, n-Dodecyl Polyglucoside, n-Tetradecyl Polyglucoside and Sorbitol 139.37 grams of the composition ($X_3$) and 28.57 grams of a 70% sorbitol solution are introduced into a reactor maintained at 40° C. The mixture is stirred for 30 minutes and then the composition obtained, named hereinafter ($X_5$), is emptied.

A-7) Composition According to the State of the Art Comprising 2-Ethylhexyl Polyglucoside and 2-Octyldodecanol ($X_6$)

36.4 grams of the composition ($X_2$) and 80 grams of 2-octyldodecanol are introduced into a reactor maintained at 40° C. The mixture is stirred for 30 minutes and then the composition ($X_6$) obtained is emptied.

The proportions, as percentages by weight, of the constituents of the compositions ($X_1$), ($X_2$), ($X_3$), ($X_4$), ($X_5$) and ($X_6$) thus obtained are recorded in table 1 below.

TABLE 1

|  | ($X_0$) | ($X_1$) | ($X_2$) | ($X_3$) | ($X_4$) | ($X_5$) | ($X_6$)[1] |
| --- | --- | --- | --- | --- | --- | --- | --- |
| n-heptyl polyglucoside | 100 | 0 | 0 | 50 | 0 | 40 | 0 |
| n-decyl polyglucoside | 0 | 85 | 0 | 42.5 | 42.5 | 34 | 0 |
| n-dodecyl polyglucoside | 0 | 10 | 0 | 5 | 5 | 4 | 0 |
| n-tetradecyl polyglucoside | 0 | 5 | 0 | 2.5 | 2.5 | 2 | 0 |
| 2-ethylhexyl polyglucoside | 0 | 0 | 100 | 0 | 50 | 0 | 20 |
| sorbitol | 0 | 0 | 0 | 0 | 0 | 20 | 0 |
| 2-octyldodecanol | 0 | 0 | 0 | 0 | 0 | 0 | 80 |

[1] ($X_6$) is disclosed in the United States patent application published under the number US 2003/0232726 A1.

B—PREPARATION OF COMPOSITIONS (C) EMPLOYED IN THE PROCESS ACCORDING TO THE INVENTION

B-1) Compositions (C) in which the Salt (S) is Calcium Chloride

Each of the compositions is prepared according to the following same procedure:
  The desired amount of water is introduced with stirring into a reactor maintained at 10° C., followed by the amount of calcium chloride desired, and then the resulting mixture is stirred for 30 minutes. The other ingredients are then successively added at 20° C. and the combined mixture is stirred until a clear solution is obtained.

The proportions, as percentages by weight, of the constituents of the compositions (C) thus obtained, named hereinafter ($F_{13}$), ($F_{14}$), ($F_{15}$), ($F_{16}$) and ($F_{17}$), and also of the compositions ($F_{11}$), ($F_{12}$) and ($F_{18}$), according to the state of the art, are recorded in table 2 below.

TABLE 2

|  | ($F_{11}$) | ($F_{12}$) | ($F_{13}$) | ($F_{14}$) | ($F_{15}$) | ($F_{16}$) | ($F_{17}$) | ($F_{18}$) |
| --- | --- | --- | --- | --- | --- | --- | --- | --- |
| $CaCl_2$ | 35 | 35 | 35 | 35 | 35 | 35 | 35 | 35 |
| Water | 59.8 | 59.8 | 59.8 | 59.8 | 59.8 | 59.8 | 59.8 | 59.8 |
| Estisol ™ 240 [1] | 0.2 | 0.2 | 0.2 | 0.2 | 0.2 | 0.2 | 0.2 | 0.2 |
| PEG 300 [2] | 5 | 0 | 0 | 0 | 0 | 0 | 0 | 0 |
| PEG 6000 [2] | 0 | 5 | 0 | 0 | 0 | 0 | 0 | 0 |
| ($X_1$) [2] | 0 | 0 | 5 | 0 | 0 | 0 | 0 | 0 |
| ($X_2$) [2] | 0 | 0 | 0 | 5 | 0 | 0 | 0 | 0 |
| ($X_0$) [2] | 0 | 0 | 0 | 0 | 5 | 0 | 0 | 0 |
| ($X_3$) [2] | 0 | 0 | 0 | 0 | 0 | 5 | 0 | 0 |
| ($X_5$) [2] | 0 | 0 | 0 | 0 | 0 | 0 | 5 | 0 |
| ($X_6$) [2] | 0 | 0 | 0 | 0 | 0 | 0 | 0 | 5 |

[1] Estisol ™ 240 is an antifoaming agent sold by Estichem.
[2] The content of lubricant is expressed as percentage by weight of its solids content.

B-2) Compositions (C) in which the Salt (S) is Potassium Chloride

Each of the compositions is prepared according to the following same procedure:
  The desired amount of water is introduced with stirring into a reactor maintained at 20° C., followed by the amount of potassium chloride desired, and then the resulting mixture is stirred for 30 minutes. The other ingredients are then successively added at 20° C. and the combined mixture is stirred until a clear solution is obtained.

The proportions, as percentages by weight, of the constituents of the compositions (C) thus obtained, named hereinafter ($F_{22}$), ($F_{23}$), ($F_{24}$), ($F_{25}$), ($F_{26}$) and ($F_{27}$), and also of the composition ($F_{21}$), according to the state of the art, are recorded in table 3 below.

TABLE 3

|  | ($F_{21}$) | ($F_{22}$) | ($F_{23}$) | ($F_{24}$) | ($F_{25}$) | ($F_{26}$) | ($F_{27}$) |
| --- | --- | --- | --- | --- | --- | --- | --- |
| KCl | 20 | 20 | 20 | 20 | 20 | 20 | 20 |
| Estisol ™ 240 | 0.2 | 0.2 | 0.2 | 0.2 | 0.2 | 0.2 | 0.2 |
| Water | 74.8 | 74.8 | 74.8 | 74.8 | 74.8 | 74.8 | 74.8 |
| PEG 300 [1] | 5 | 0 | 0 | 0 | 0 | 0 | 0 |
| ($X_1$) [1] | 0 | 5 | 0 | 0 | 0 | 0 | 0 |
| ($X_2$) [1] | 0 | 0 | 5 | 0 | 0 | 0 | 0 |
| ($X_0$) [1] | 0 | 0 | 0 | 5 | 0 | 0 | 0 |
| ($X_3$) [1] | 0 | 0 | 0 | 0 | 5 | 0 | 0 |
| ($X_4$) [1] | 0 | 0 | 0 | 0 | 0 | 5 | 0 |
| ($X_5$) [1] | 0 | 0 | 0 | 0 | 0 | 0 | 5 |

[1] The content of lubricant is expressed as percentage by weight of its solids content.

B-3) Compositions (C) in which the Salt (S) is a Mixture of Sodium Silicate and Potassium Carbonate Each of the compositions ($F_{31}$), ($F_{32}$), ($F_{33}$) and ($F_{34}$) is prepared according to the following same procedure:
  the desired amount of water is introduced with stirring into a reactor maintained at 20° C., followed by the desired amounts of sodium silicate and potassium carbonate, and then the resulting mixture is stirred for 30 minutes. The other ingredients are then successively added at 20° C. and the combined mixture is stirred until a clear solution is obtained.

The proportions, as percentages by weight, of the constituents of the compositions (C) thus obtained, named hereinafter ($F_{32}$), ($F_{33}$) and ($F_{34}$), and also of the composition ($F_{31}$) according to the state of the art, are recorded in table 4 below.

TABLE 4

|  | ($F_{31}$)[2] | ($F_{32}$) | ($F_{33}$) | ($F_{34}$) |
| --- | --- | --- | --- | --- |
| Sodium silicate | 5 | 5 | 5 | 5 |
| $K_2CO_3$ | 3 | 3 | 3 | 3 |
| Estisol ™ 240 | 0.2 | 0.2 | 0.2 | 0.2 |
| Water | 88.8 | 88.8 | 88.8 | 88.8 |
| ($X_6$)[1] | 3 | 0 | 0 | 0 |
| ($X_3$)[1] | 0 | 3 | 0 | 0 |
| ($X_4$)[1] | 0 | 0 | 3 | 0 |
| ($X_5$)[1] | 0 | 0 | 0 | 3 |

[1] The content of lubricant is expressed as percentage by weight of its solids content.
[2] The composition ($F_{31}$) is disclosed in the United States patent application published under the number US 2003/0232726 A1.

C—STUDY OF THE STABILITY OF THE COMPOSITIONS (C)

The stability of the compositions (C), the preparation of which is set out in section B) above, and also that of the compositions ($F_{11}$), ($F_{12}$), ($F_{18}$), ($F_{21}$) and ($F_{31}$), according to the state of the art, was studied as follows:
  an identical amount of each of the compositions (C) was stored in an insulated climatically controlled chamber regulated at a temperature of 20° C. for one month, at the end of which period of time the appearance of these samples was evaluated, an identical amount of each of the compositions (C) was stored in an insulated climatically controlled chamber regulated at a temperature of 90° C. for 16 hours, in order to evaluate their aging under conditions of drilling at depth. The appearance of each sample was noted after a storage time of 16 hours under these conditions.

The results of these evaluations are recorded in table 5 below ("Ho.": Homogeneous appearance; "He.": Heterogeneous appearance).

TABLE 5

|  | ($F_{11}$) | ($F_{12}$) | ($F_{13}$) | ($F_{14}$) | ($F_{15}$) | ($F_{16}$) | ($F_{17}$) | ($F_{18}$) |
|---|---|---|---|---|---|---|---|---|
| Appearance after one month at 20° C. | Ho. | Ho. | Ho. | Ho. | Ho. | Ho. | Ho. | He. |
| Appearance after 16 h at 90° C. | Ho. | Ho. | Ho. | Ho. | Ho. | Ho. | Ho. | He. |

|  | ($F_{21}$) | ($F_{22}$) | ($F_{23}$) | ($F_{24}$) | ($F_{25}$) | ($F_{26}$) | ($F_{27}$) |
|---|---|---|---|---|---|---|---|
| Appearance after one month at 20° C. | Ho. | Ho. | Ho. | Ho. | Ho. | Ho. | Ho. |
| Appearance after 16 h at 90° C. | Ho. | Ho. | Ho. | Ho. | Ho. | Ho. | Ho. |

|  | ($F_{31}$) | ($F_{32}$) | ($F_{33}$) | ($F_{34}$) |
|---|---|---|---|---|
| Appearance after one month at 20° C. | He. | Ho. | Ho. | Ho. |
| Appearance after 16 h at 90° C. | He. | Ho. | Ho. | Ho. |

These evaluations reveal that the compositions (C) according to the invention exhibit a homogeneous appearance under the storage conditions of the tests carried out, whereas the compositions ($F_{18}$) and ($F_{31}$), comprising the lubricating system ($X_6$) disclosed in the United States patent application published under the number US 2003/0232726, exhibit a heterogeneous appearance under the same storage conditions.

D—EVALUATION OF THE LUBRICATING POWER OF THE COMPOSITIONS (C)

D-1) General Principle of the Study

The lubricating power is evaluated using the apparatus known as E.P. (Extreme Pressure & Lubricity Tester); 230 V, 50 Hz Digital, sold by OFITE (Instruction Manual Part 111-00-1), equipped with a rotating ring (reference OFITE 111-02) and with a stationary block (reference OFITE 111-08). The tests are carried out according to the procedures recommended by the standard RP 13B of the American Petroleum Institute (API), with a rotational speed of the ring of 60 revolutions per minute and with the following values for moments of force applied between the ring and the stationary block: 11.298 Nm (100 pound-force inches), 16.948 Nm (150 pound-force inches) and 22.597 Nm (200 pound-force inches), according to the scenarios. In this continuous system of measurement, the higher the value of the moment of force, the higher the pressure which is associated with it and consequently the stronger the frictional forces. In order to compare the lubricating powers of the various compositions:

the readings for the graduations obtained with the test apparatus described above, corresponding to relative values of the friction torque between the ring and the block ($V^{fric.}$) in the presence of said compositions under the experimental test conditions (the friction torque is a unitless value, measured for a specific moment of force exerted on the ring by the block), is recorded;

the value of a lubricating coefficient of the composition (λ) is calculated according to the following formula:

$$\lambda = (V^{fric.}/100) \times (V_{std.}^{fric.}/V_0^{fric.})$$

with $V_{std.}^{fric.}$ representing the standard value of the friction torque of deionized water which, under the measurement conditions described, namely a rotational speed of the ring of 60 revolutions/minute, is equal to 34 (Instruction Manual Part 111-00-1 for the E.P. (Extreme Pressure) & Lubricity Tester; 230 V, 50 Hz Digital apparatus, sold by OFITE) and $V_0^{fric.}$ representing the experimental value of the friction torque of the water;

the percentage of reduction in the torsion torque ($\delta_{red.}$) is calculated according to the following formula:

$$\delta_{red.} = [100 \times (\lambda_0 - \lambda)]/\lambda_0$$

with $\lambda_0$ representing the lubricating coefficient of the aqueous base.

"Aqueous base" is understood to mean the solution comprising water and the content of salt at the concentration by weight desired.

According to the experimental test described above, the lower the relative value of the friction torque, the better the lubricating power of the composition tested.

The improvement in the lubricating power of a composition will be found:

when the relative value of the friction torque of the composition evaluated is lower than the relative value of the friction torque of the aqueous base as defined above, and by the percentage of reduction in the torsion torque of the composition evaluated.

D-2) Lubricating Power of Compositions Based on Calcium Chloride

The compositions ($F_{11}$), ($F_{12}$), ($F_{13}$), ($F_{14}$), ($F_{15}$), ($F_{16}$) and ($F_{17}$) are evaluated by the experimental procedure described above, with a rotational speed of the ring of 60 revolutions/minute and a value of moment of force applied between the ring and the stationary block of 11.298 Nm (100 inch-pound force), and compared with water and with a 35% by weight aqueous calcium chloride solution (composition $T_1$). The results obtained are recorded in table 6 below.

TABLE 6

|  | $V^{fric.}$ | $\lambda$ | $\delta_{red.}$ |
|---|---|---|---|
| Water | 32.4 | — | — |
| ($T_1$) | 17.5 | 0.184 | — |
| ($F_{11}$) | 11.4 | 0.120 | 35% |
| ($F_{12}$) | 14.0 | 0.147 | 20% |
| ($F_{13}$) | 7.5 | 0.079 | 57% |
| ($F_{14}$) | 12.1 | 0.127 | 31% |
| ($F_{15}$) | 0.5 | 0.005 | 97% |
| ($F_{16}$) | 1.13 | 0.012 | 93% |
| ($F_{17}$) | 1.13 | 0.012 | 93% |

These results reveal that the compositions ($F_{13}$), ($F_{14}$), ($F_{15}$), ($F_{16}$) and ($F_{17}$), respectively comprising the compositions ($X_1$), ($X_2$), ($X_0$), ($X_3$) and ($X_5$), exhibit relative values of the friction torque which are significantly lower than the value of the friction torque of the composition ($T_1$).

Furthermore, the compositions ($F_{13}$), ($F_{15}$), ($F_{16}$) and ($F_{17}$) exhibit a percentage of reduction in the torsion torque, with respect to the composition ($T_1$), which is greater than the percentage reduction in the torsion torque of the compositions ($F_{11}$) and ($F_{12}$) comprising lubricants described in the state of the art (in the case in point, PEG 300 and PEG 6000).

D-3) Lubricating Power of Compositions Based on Potassium Chloride

D-3.1) Compositions which have not been Subjected to Accelerated Aging

The compositions ($F_{21}$), ($F_{22}$), ($F_{23}$), ($F_{24}$), ($F_{25}$), ($F_{26}$) and ($F_{27}$) are evaluated by the experimental procedure described in the preceding section D-1), with a rotational speed of the ring of 60 revolutions/minute and values of moments of force applied between the ring and the stationary block of 11.298 Nm (100 pound-force inches), 16.948 Nm (150 pound-force inches) and 22.597 Nm (200 pound-force inches) and are compared with water and with a 20% by weight aqueous potassium chloride solution (composition $T_2$).

The results obtained are recorded in table 7 below.

TABLE 7

| | 11.298 Nm | | | 16.948 Nm | | | 22.597 Nm | | |
|---|---|---|---|---|---|---|---|---|---|
| | $V^{fric.}$ | $\lambda$ | $\delta_{red.}$ | $V^{fric.}$ | $\lambda$ | $\delta_{red.}$ | $V^{fric.}$ | $\lambda$ | $\delta_{red.}$ |
| Water | 34 | — | — | 34.0 | — | — | 33.6 | — | — |
| ($T_2$) | 15.7 | 0.157 | — | 21.4 | 0.214 | — | 27.9 | 0.283 | — |
| ($F_{21}$) | 8.2 | 0.082 | 47% | 14.5 | 0.145 | 32% | 21.3 | 0.216 | 24% |
| ($F_{22}$) | 5.2 | 0.052 | 67% | 8.4 | 0.084 | 61% | 11.7 | 0.118 | 58% |
| ($F_{23}$) | 8.3 | 0.083 | 47% | 11.5 | 0.115 | 46% | 14.3 | 0.145 | 49% |
| ($F_{24}$) | 8.6 | 0.086 | 45% | 12.4 | 0.124 | 42% | 15.6 | 0.158 | 45% |
| ($F_{25}$) | 6.3 | 0.063 | 60% | 9.1 | 0.091 | 57% | 12.3 | 0.125 | 56% |
| ($F_{26}$) | 3.4 | 0.034 | 79% | 6.7 | 0.067 | 69% | 12.1 | 0.123 | 57% |
| ($F_{27}$) | 5.8 | 0.058 | 63% | 9.2 | 0.092 | 57% | 12.0 | 0.121 | 57% |

D-3.2) Compositions which have been Subjected to Accelerated Aging

Samples of each of the compositions ($F_{21}$), ($F_{22}$), ($F_{23}$), ($F_{24}$), ($F_{25}$), ($F_{26}$) and ($F_{27}$) were placed in a roller oven at a temperature of 120° C. for 16 hours in order to obtain the compositions respectively referenced (F'$_{21}$), (F'$_{22}$), (F'$_{23}$), (F'$_{24}$), (F'$_{25}$), (F'$_{26}$) and (F'$_{27}$). These storage conditions make it possible to simulate the temperature conditions experienced by drilling fluid when it is used in a drilling process at great depth. The latter compositions are subsequently evaluated by the experimental procedure described in the preceding section D-1), with a rotational speed of the ring of 60 revolutions/minute and values of moments of force applied between the ring and the stationary block of 11.298 Nm (100 pound-force inches), 16.948 Nm (150 pound-force inches) and 22.597 Nm (200 pound-force inches), and are compared with water and with aqueous solution $T_2$.

The results obtained are recorded in table 8 below.

TABLE 8

| | 11.298 Nm | | | 16.948 Nm | | | 22.597 Nm | | |
|---|---|---|---|---|---|---|---|---|---|
| | $V^{fric.}$ | $\lambda$ | $\delta_{red.}$ | $V^{fric.}$ | $\lambda$ | $\delta_{red.}$ | $V^{fric.}$ | $\lambda$ | $\delta_{red.}$ |
| Water | 34.0 | — | — | 34.0 | — | — | 34.0 | — | — |
| ($T_2$) | 17.5 | 0.175 | — | 25.3 | 0.253 | — | 32.9 | 0.329 | — |
| (F'$_{21}$) | 11.1 | 0.111 | 37% | 15.6 | 0.156 | 38% | 22.3 | 0.223 | 32% |
| (F'$_{22}$) | 3.5 | 0.037 | 79% | 6.6 | 0.066 | 74% | 9.5 | 0.095 | 71% |
| (F'$_{23}$) | 7.4 | 0.075 | 55% | 11.5 | 0.115 | 55% | 15.1 | 0.151 | 55% |
| (F'$_{24}$) | 6.2 | 0.062 | 65% | 9.6 | 0.096 | 62% | 12.6 | 0.126 | 62% |
| (F'$_{25}$) | 2.3 | 0.023 | 87% | 5.8 | 0.058 | 77% | 12.8 | 0.128 | 61% |
| (F'$_{26}$) | 2.9 | 0.029 | 83% | 3.7 | 0.037 | 85% | 12.3 | 0.123 | 63% |
| (F'$_{27}$) | 4.5 | 0.045 | 74% | 8.8 | 0.088 | 65% | 12.6 | 0.126 | 65% |

D-3.3) Analysis of the Results

The compositions ($F_{22}$), ($F_{23}$), ($F_{24}$), ($F_{25}$), ($F_{26}$) and ($F_{27}$), which respectively comprise the compositions ($X_1$), ($X_2$), ($X_0$), ($X_3$), ($X_4$) and ($X_5$) and which have not been subjected beforehand to accelerated aging conditions, exhibit relative values of the friction torque which are significantly lower than the value of the friction torque of the composition ($T_2$), whatever the value of the pressure exerted in carrying out the evaluation test.

For a value of moment of force applied between the ring and the stationary block equal to 11.298 Nm, the compositions ($F_{22}$), ($F_{25}$), ($F_{26}$) and ($F_{27}$) exhibit relative values of the friction torque which are significantly lower than the value of the friction torque of the composition ($F_{21}$) comprising a lubricant described in the state of the art (PEG 300).

For a value of moment of force applied between the ring and the stationary block equal to 16.948 Nm, the compositions ($F_{22}$), ($F_{23}$), ($F_{24}$), ($F_{25}$), ($F_{26}$) and ($F_{27}$) exhibit relative values of the friction torque which are significantly lower than the value of the friction torque of the composition ($F_{21}$) comprising a lubricant described in the state of the art (PEG 300).

For values of moment of force applied between the ring and the stationary block equal to 11.298 Nm, to 16.948 Nm and to 22.597 Nm, the compositions (F'$_{22}$), (F'$_{23}$), (F'$_{24}$), (F'$_{25}$), (F'$_{26}$) and (F'$_{27}$), which respectively comprise the compositions ($X_1$), ($X_2$), ($X_0$), ($X_3$), ($X_4$) and ($X_5$) and which have been subjected beforehand to accelerated aging conditions, exhibit relative values of the friction torque which are significantly lower than the value of the friction torque of the composition ($T_2$) and than the value of the friction torque of the composition ($F_{21}$) comprising a lubricant described in the state of the art (PEG 300).

Furthermore, for values of moment of force applied between the ring and the stationary block equal to 11.298 Nm and to 16.948 Nm, the compositions (F'$_{22}$), (F'$_{23}$), (F'$_{24}$), (F'$_{25}$), (F'$_{26}$) and (F'$_{27}$) exhibit relative values of the friction torque which are lower than the values of the friction torque of the respective compositions ($F_{22}$), ($F_{23}$), ($F_{24}$), ($F_{25}$), ($F_{26}$) and ($F_{27}$) whereas, under the same operating conditions, the composition (F'$_{21}$) of the state of the art, which has been subjected beforehand to accelerated aging conditions, exhibits a relative value of the friction torque which is greater than that of the composition ($F_{21}$) which has not been subjected to such aging conditions.

D-4) Study of the Lubricating Power of Drilling Compositions Based on Sodium Silicate The compositions ($F_{41}$) and ($F_{42}$) are prepared according to the following procedure:

the desired amount of water is introduced with stirring into a reactor maintained at 60° C., followed by the desired amounts of sodium silicate and sodium chloride, and then the resulting mixture is stirred for 30 minutes in order to obtain a clear solution. The desired amounts of Blanose™ 7H9, of Metolose™ 60SH50, of Rhodopol™ 23, of lubricant (in the case of ($F_{42}$)), of bentonite, of barite and of Estisol™ 240 are then successively added with stirring, the temperature being maintained at 60° C., and the resulting mixture is homogenized with stirring until a homogeneous solution is obtained.

The pH of the aqueous mud is finally adjusted to 11.0 by addition of sodium hydroxide with stirring until a homogeneous solution is obtained.

The proportions, as percentages by weight, of the constituents of the compositions ($F_{41}$) and ($F_{42}$) are recorded in table 9 below.

TABLE 9

|  | ($F_{41}$) | ($F_{42}$) |
| --- | --- | --- |
| Deionized water | q.s. 100% | q.s. 100% |
| Rhodopol ™ 23[(2)] | 0.52% | 0.52% |
| Blanose ™ 7H9[(3)] | 0.025% | 0.025% |
| Metolose ™ 60SH50[(4)] | 0.375% | 0.375% |
| Colclay ™ FG90[(5)] | 2.0% | 2.0% |
| Sodium silicate | 8.47% | 8.47% |
| Sodium chloride | 5.0% | 5.0% |
| Barite | 9.3% | 9.3% |
| Estisol ™ 240[(1)] | 0.2% | 0.2% |
| ($X_4$)[(*)] | 0% | 1.5% |
| Sodium hydroxide | q.s. pH = 11 | q.s. pH = 11 |

[(1)]Estisol ™ 240: Antifoaming agent sold by Estichem.
[(2)]Rhodopol ™ 23: Xanthan gum used as viscosifying agent and sold by Rhodia.
[(3)]Blanose ™ 7H9: Carboxymethylcellulose used as filtrate-reducing agent and sold by Aqualon.
[(4)]Metolose ™ 60SH50: Hydroxypropylmethylcellulose used as filtrate-reducing agent and sold by Aqualon.
[(5)]Colclay ™ FG90: Bentonite used as inorganic thickening agent and sold by Minerais de la Méditerranée.
[(*)]Content by weight as solids content.

Samples of each of the compositions ($F_{41}$) and ($F_{42}$) were placed in a roller oven at a temperature of 120° C. for 16 hours. These storage conditions make it possible to simulate the temperature conditions experienced by drilling fluid when it is used in a drilling process at great depth. These compositions are subsequently evaluated by the experimental procedure described in the preceding section D-1), with a rotational speed of the ring of 60 revolutions/minute and values of moments of force applied between the ring and the stationary block of 16.948 Nm (150 pound-force inches), and are compared with water.

The results obtained are recorded in table 10 below.

TABLE 10

|  | Appearance | $V^{fric.}$ | $\lambda$ | $\delta_{red.}$ |
| --- | --- | --- | --- | --- |
| Water | Ho. | 32.7 | 0.340 | — |
| ($F_{41}$) | Ho. | 36.3 | 0.377 | — |
| ($F_{42}$) | Ho. | 27.0 | 0.281 | 25% |

Under the experimental conditions for evaluating the lubricating power as described above, the composition ($F_{42}$), which has been subjected beforehand to accelerated aging conditions and which comprises the lubricating composition ($X_4$), exhibits a relative value of the friction torque which is significantly lower than the value of the friction torque of the composition ($F_{41}$) not comprising lubricating agent. Furthermore, the composition ($F_{42}$) makes it possible to reduce the torsion torque by a value of 25%, with respect to the composition ($F_{41}$).

E—STUDY OF THE PROPERTIES OF INHIBITING THE SWELLING OF CLAYS

The properties of inhibiting the swelling of clays are demonstrated according to a method which consists in evaluating the rheological characteristics of a dispersion of 5.7 grams (i.e. 10 lb/bbl) of API bentonite in 200 ml of aqueous phase. This method, described in the paper entitled "*Advances in inhibitive water-based drilling fluids—Can they replace oil-based muds*" (Society of Petroleum Engineers, SPE 106476, 2007), comprises the following stages:

a)—the preparation of the aqueous compositions to be tested;

b)—the calculation of their yield points from the measurement of the shear stresses, at different rate gradients;

c)—the addition of an amount of 5.7 grams (i.e. 10 lb/bbl) of API bentonite to each of the aqueous compositions to be tested;

d)—the storage of the compositions prepared in stage c) in a roller oven at 65° C. (150° F.) for 16 hours;

e)—the calculation of the yield points of the aqueous compositions resulting from stage d);

f)—in the event that the yield point measured in stage e) does not change significantly, stages c), d) and e) are successively applied to the composition concerned until a value of the yield point is obtained which is significantly different from that obtained in the preceding stage.

For each experimental composition, the calculation of the yield point employs a method adapted from the standard API 13B-1 ("Recommended Practice for Field Testing Water-based Drilling Fluids"), which consists in determining the rheological properties of said composition by the measurement of the shear stresses of said composition at different rotational speeds ($CS_v$).

The viscosity measurements necessary for the calculation of the yield point are carried out using the Speed Viscometer, Model 800, apparatus, equipped with the R1B1 rotor-stator, sold by OFITE, at 20° C. and at speeds of 600 revolutions/minute, of 300 revolutions/minute, of 200 revolutions/minute, of 100 revolutions/minute, of 60 revolutions/minute, of 30 revolutions/minute, of 6 revolutions/minute and of 3 revolutions/minute. For these measurements, the experimenter calculates:

the apparent viscosity (AV) according to the following formula:

$$AV = CS_{600}/2$$

the plastic viscosity (PV) according to the following formula:

$$PV = CS_{600} - CS_{300}$$

the yield point (YP) according to the following formula:

$$YP = \text{Viscosity at 300 revolutions/minute} - PV$$

The shear stresses at the different speeds are measured in lb/100 ft² and the yield point is also expressed in lb/100 ft² (taking into consideration that 1 lb/100 ft²=0.0488 kg/m²).

The aqueous compositions tested according to the method for evaluating the properties of inhibiting the swelling of clays are referenced ($F_{51}$) and ($F_{52}$) and are prepared according to the following same procedure:

the desired amount of water is introduced with stirring into a reactor maintained at 20° C., followed by the desired amount of calcium chloride, and then the resulting mixture is stirred for 30 minutes. The other ingredients are then successively added at 20° C. and the combined mixture is stirred until a clear solution is obtained.

The proportions, as percentages by weight, of the constituents of the compositions ($F_{51}$) and ($F_{52}$) are recorded in table 11 below.

TABLE 11

|  | ($F_{51}$) | ($F_{52}$) |
|---|---|---|
| CaCl₂ | 35% | 35% |
| Water | q.s. 100% | q.s. 100% |
| Estisol ™ 240⁽¹⁾ | 0% | 0.2% |
| ($X_4$) | 0% | 5% |

The values of the yield points measured, after each addition of an amount of 10 lb/bbl (i.e. 5.7 grams) of API bentonite to each of the aqueous compositions ($F_{51}$) and ($F_{52}$), are recorded in the following table 12:

TABLE 12

| | Water YP in: | | ($F_{51}$) YP in: | | ($F_{52}$) YP in: | |
|---|---|---|---|---|---|---|
| Bentonite added | lb/100 ft² | kg·m⁻² | lb/100 ft² | kg·m⁻² | lb/100 ft² | kg·m⁻² |
| 10 lb/bbl (5.7 g) | 1 | 0.0488 | 1 | 0.0488 | 1 | 0.0488 |
| 20 lb/bbl (11.4 g) | 15 | 0.732 | 1 | 0.0488 | 1 | 0.0488 |
| 30 lb/bbl (17.1 g) | 105 | 5.124 | 1 | 0.0488 | 1 | 0.0488 |
| 40 lb/bbl (22.8 g) | n.d. | n.d. | 5 | 0.244 | 1 | 0.0488 |
| 50 lb/bbl (28.5 g) | n.d. | n.d. | 10 | 0.488 | 1 | 0.0488 |
| 60 lb/bbl (34.2 g) | n.d. | n.d. | 20 | 0.976 | 1 | 0.0488 |
| 70 lb/bbl (39.9 g) | n.d. | n.d. | 25 | 1.220 | 1 | 0.0488 |
| 80 lb/bbl (45.6 g) | n.d. | n.d. | 35 | 1.708 | 1 | 0.0488 | n.d.: not determined

Under the evaluative experimental conditions as described above, it is observed that the yield point of the composition ($F_{52}$), comprising the composition ($X_4$) according to the invention, remains equal to 1 lb/100 ft² (i.e. 0.0488 kg·m²) after the addition of 80 lb/bbl (i.e. 45.6 g) of API bentonite, whereas the yield point of the control composition ($F_{51}$) amounts to 35 lb/100 ft² (i.e. 1.708 kg·m⁻²). The composition ($X_4$) thus provides properties for inhibiting the swelling of clays to an aqueous composition capable of being used in a drilling process according to the invention.

F—CONCLUSIONS

The results set out above reveal that the aqueous drilling fluids comprising salts and at least one composition ($C_1$) represented by the formula (I) as described above exhibit a stability on storage (lasting homogeneity), significant properties of inhibiting the swelling of clays and an improved lubricating power, with respect to the aqueous fluids used in the drilling processes of the state of the art.

The invention claimed is:

1. A process for drilling cavities in subterranean formations, said process comprising discharging drilling cuttings from said subterranean formations by injection, into a drilling well, of an aqueous composition (C) comprising, per 100% by weight:

from 1% to 65% by weight of at least one salt (S) selected from the group consisting of sodium chloride, potassium chloride, calcium chloride, potassium carbonate, calcium bromide, zinc bromide, sodium silicate, sodium metasilicate and sodium tetraborate;

from 0.05% to 2% by weight of at least one antifoaming agent, from 13% to 97.95% by weight of water, and from 1% to 20% by weight of a composition ($C_2$) comprising, per 100% of said composition ($C_2$):

from 0.1% to 30% by weight of at least one auxiliary agent selected from the group consisting of erythritol, xylitol, sorbitol, sodium gluconate, glucose and maltodextrins;

from 35% to 99.9% by weight of a surfactant (Su) system consisting of, for 100% by weight of said surfactant (Su) system, a mixture of:

(1) 25% to 78% by weight of a first composition ($C_1$) represented by formula (I):

$$R_1\text{—O-}(G_1)_p\text{-H} \quad (I)$$

in which $R_1$ represents a heptyl radical, $G_1$ represents the residue of a reducing sugar selected from the group consisting of glucose, xylose and arabinose, and p represents a decimal number greater than or equal to 1.05 and less than or equal to 2.5, said first composition ($C_1$) consisting of a mixture of compounds represented by the formulae ($I_1$), ($I_2$), ($I_3$), ($I_4$) and ($I_5$):

$$R_1\text{—O-}(G_1)_1\text{-H} \quad (I_1),$$

$$R_1\text{—O-}(G_1)_2\text{-H} \quad (I_2),$$

$$R_1\text{—O-}(G_1)_3\text{-H} \quad (I_3),$$

$$R_1\text{—O-}(G_1)_4\text{-H} \quad (I_4),$$

$$R_1\text{—O-}(G_1)_5\text{-H} \quad (I_5),$$

in the respective molar proportions $a_1$, $a_2$, $a_3$, $a_4$ and $a_5$ such that $a_1+a_2+a_3+a_4+a_5$ is equal to 1, and $a_1+2a_2+3a_3+4a_4+5a_5$ is equal to p, (2) 20% to 50% by weight of a second composition ($C_1$) represented by formula (I):

$$R_1\text{—O-}(G_1)_p\text{-H} \quad (I)$$

in which $R_1$ represents a decyl radical, $G_1$ represents the residue of a reducing sugar selected from the group consisting of glucose, xylose and arabinose, and p represents a decimal number greater than or equal to 1.05 and less than or equal to 2.5, said second composition ($C_1$) consisting of a mixture of compounds represented by the formulae ($I_1$), ($I_2$), ($I_3$), ($I_4$) and ($I_5$):

$$R_1\text{—O-}(G_1)_1\text{-H} \qquad (I_1),$$

$$R_1\text{—O-}(G_1)_2\text{-H} \qquad (I_2),$$

$$R_1\text{—O-}(G_1)_3\text{-H} \qquad (I_3),$$

$$R_1\text{—O-}(G_1)_4\text{-H} \qquad (I_4),$$

$$R_1\text{—O-}(G_1)_5\text{-H} \qquad (I_5),$$

in the respective molar proportions $a_1$, $a_2$, $a_3$, $a_4$ and $a_5$ such that $a_1+a_2+a_3+a_4+a_5$ is equal to 1, and $a_1+2a_2+3a_3+4a_4+5a_5$ is equal to p, (3) 1% to 15% by weight of a third composition ($C_1$) represented by formula (I):

$$R_1\text{—O-}(G_1)_p\text{-H} \qquad (I)$$

in which $R_1$ represents a dodecyl radical, $G_1$ represents the residue of a reducing sugar selected from the group consisting of glucose, xylose and arabinose, and p represents a decimal number greater than or equal to 1.05 and less than or equal to 2.5, said third composition ($C_1$) consisting of a mixture of compounds represented by the formulae ($I_1$), ($I_2$), ($I_3$), ($I_4$) and ($I_5$):

$$R_1\text{—O-}(G_1)_1\text{-H} \qquad (I_1),$$

$$R_1\text{—O-}(G_1)_2\text{-H} \qquad (I_2),$$

$$R_1\text{—O-}(G_1)_3\text{-H} \qquad (I_3),$$

$$R_1\text{—O-}(G_1)_4\text{-H} \qquad (I_4),$$

$$R_1\text{—O-}(G_1)_5\text{-H} \qquad (I_5),$$

in the respective molar proportions $a_1$, $a_2$, $a_3$, $a_4$ and $a_5$ such that $a_1+a_2+a_3+a_4+a_5$ is equal to 1, and $a_1+2a_2+3a_3+4a_4+5a_5$ is equal to p, and (4) 1% to 10% by weight of a fourth composition ($C_1$) represented by formula (I):

$$R_1\text{—O-}(G_1)_p\text{-H} \qquad (I)$$

in which $R_1$ represents a tetradecyl radical, $G_1$ represents the residue of a reducing sugar selected from the group consisting of glucose, xylose and arabinose, and p represents a decimal number greater than or equal to 1.05 and less than or equal to 2.5, said fourth composition ($C_1$) consisting of a mixture of compounds represented by the formulae ($I_1$), ($I_2$), ($I_3$), ($I_4$) and ($I_5$):

$$R_1\text{—O-}(G_1)_1\text{-H} \qquad (I_1),$$

$$R_1\text{—O-}(G_1)_2\text{-H} \qquad (I_2),$$

$$R_1\text{—O-}(G_1)_3\text{-H} \qquad (I_3),$$

$$R_1\text{—O-}(G_1)_4\text{-H} \qquad (I_4),$$

$$R_1\text{—O-}(G_1)_5\text{-H} \qquad (I_5),$$

in the respective molar proportions $a_1$, $a_2$, $a_3$, $a_4$ and $a_5$ such that $a_1+a_2+a_3+a_4+a_5$ is equal to 1, and $a_1+2a_2+3a_3+4a_4+5a_5$ is equal to p, and from 0% to 35% by weight of at least one alcohol of formula (II):

$$R_1\text{—OH} \qquad (II)$$

in which $R_1$ represents a saturated or unsaturated and linear or branched aliphatic radical comprising from 4 to 16 carbon atoms.

2. The process as defined in claim 1, wherein said composition ($C_2$) comprises, per 100% by weight:
greater than or equal to 90% and less than 100% by weight of said surfactant (Su) system, and
greater than 0% and less than or equal to 10% by weight of said alcohol of formula (II).

3. A composition ($C_{21}$) comprising, per 100% by weight:
from 0.1% to 30% by weight of at least one auxiliary agent selected from the group consisting of erythritol, xylitol, sorbitol, sodium gluconate, glucose and maltodextrins,
from 5% to 100% by weight of a mixture ($M_1$) consisting of, per 100% by weight of said mixture ($M_1$):
(1) from 25% to 78% by weight of a first composition ($C_1$) represented by formula (I):

$$R_1\text{—O-}(G_1)_p\text{-H} \qquad (I)$$

in which $R_1$ represents a heptyl radical, $G_1$ represents the residue of a reducing sugar selected from the group consisting of glucose, xylose and arabinose, and p represents a decimal number greater than or equal to 1.05 and less than or equal to 2.5, said first composition ($C_1$) consisting of a mixture of compounds represented by the formulae ($I_1$), ($I_2$), ($I_3$), ($I_4$) and ($I_5$):

$$R_1\text{—O-}(G_1)_1\text{-H} \qquad (I_1),$$

$$R_1\text{—O-}(G_1)_2\text{-H} \qquad (I_2),$$

$$R_1\text{—O-}(G_1)_3\text{-H} \qquad (I_3),$$

$$R_1\text{—O-}(G_1)_4\text{-H} \qquad (I_4),$$

$$R_1\text{—O-}(G_1)_5\text{-H} \qquad (I_5),$$

in the respective molar proportions $a_1$, $a_2$, $a_3$, $a_4$ and $a_5$ such that $a_1+a_2+a_3+a_4+a_5$ is equal to 1, and $a_1+2a_2+3a_3+4a_4+5a_5$ is equal to p, (2) from 20% to 50% by weight of a second composition ($C_1$) represented by formula (I):

$$R_1\text{—O-}(G_1)_p\text{-H} \qquad (I)$$

in which $R_1$ represents a decyl radical, $G_1$ represents the residue of a reducing sugar selected from the group consisting of glucose, xylose and arabinose, and p represents a decimal number greater than or equal to 1.05 and less than or equal to 2.5, said second composition ($C_1$) consisting of a mixture of compounds represented by the formulae ($I_1$), ($I_2$), ($I_3$), ($I_4$) and ($I_5$):

$$R_1\text{—O-}(G_1)_1\text{-H} \qquad (I_1),$$

$$R_1\text{—O-}(G_1)_2\text{-H} \qquad (I_2),$$

$$R_1\text{—O-}(G_1)_3\text{-H} \qquad (I_3),$$

$$R_1\text{—O-}(G_1)_4\text{-H} \qquad (I_4),$$

$$R_1\text{—O-}(G_1)_5\text{-H} \qquad (I_5),$$

in the respective molar proportions $a_1$, $a_2$, $a_3$, $a_4$ and $a_5$ such that $a_1+a_2+a_3+a_4+a_5$ is equal to 1, and $a_1+2a_2+3a_3+4a_4+5a_5$ is equal to p, (3) from 1% to 15% by weight of a third composition ($C_1$) represented by formula (I):

$$R_1\text{—O-}(G_1)_p\text{-H} \qquad (I)$$

in which $R_1$ represents a dodecyl radical, $G_1$ represents the residue of a reducing sugar selected from the group consisting of glucose, xylose and arabinose, and p represents a decimal number greater than or equal to 1.05 and less than or equal to 2.5, said third composition ($C_1$) consisting of a mixture of compounds represented by the formulae ($I_1$), ($I_2$), ($I_3$), ($I_4$) and ($I_5$):

$$R_1\text{—O-}(G_1)_1\text{-H} \quad (I_1),$$

$$R_1\text{—O-}(G_1)_2\text{-H} \quad (I_2),$$

$$R_1\text{—O-}(G_1)_3\text{-H} \quad (I_3),$$

$$R_1\text{—O-}(G_1)_4\text{-H} \quad (I_4),$$

$$R_1\text{—O-}(G_1)_5\text{-H} \quad (I_5),$$

in the respective molar proportions $a_1$, $a_2$, $a_3$, $a_4$ and $a_5$ such that $a_1+a_2+a_3+a_4+a_5$ is equal to 1, and $a_1+2a_2+3a_3+4a_4+5a_5$ is equal to p, and
(4) from 1% to 10% by weight of a fourth composition ($C_1$) represented by formula (I):

$$R_1\text{—O-}(G_1)_p\text{-H} \quad (I)$$

in which $R_1$ represents a tetradecyl radical, $G_1$ represents the residue of a reducing sugar selected from the group consisting of glucose, xylose and arabinose, and p represents a decimal number greater than or equal to 1.05 and less than or equal to 2.5, said fourth composition ($C_1$) consisting of a mixture of compounds represented by the formulae ($I_1$), ($I_2$), ($I_3$), ($I_4$) and ($I_5$):

$$R_1\text{—O-}(G_1)_1\text{-H} \quad (I_1),$$

$$R_1\text{—O-}(G_1)_2\text{-H} \quad (I_2),$$

$$R_1\text{—O-}(G_1)_3\text{-H} \quad (I_3),$$

$$R_1\text{—O-}(G_1)_4\text{-H} \quad (I_4),$$

$$R_1\text{—O-}(G_1)_5\text{-H} \quad (I_5),$$

in the respective molar proportions $a_1$, $a_2$, $a_3$, $a_4$ and $a_5$ such that $a_1+a_2+a_3+a_4+a_5$ is equal to 1, and $a_1+2a_2+3a_3+4a_4+5a_5$ is equal to p, and
from 0% to 95% by weight of water.

4. A process for drilling cavities in subterranean formations, said process comprising discharging drilling cuttings from said subterranean formations by injection, into a drilling well, of an aqueous composition (C) comprising, per 100% by weight:
from 1% to 65% by weight of at least one salt (S) consisting of at least one cation chosen from an ammonium ion and metal cations and at least one anion selected from the group consisting of chloride, bromide, carbonate, bicarbonate, hydrogencarbonate, silicate, metasilicate, sulfate, hydrogensulfate, borate, tetraborate, dihydrogenborate, hydrogenborate or hydrogentetraborate ions and organic anions carrying a carboxylate functional group;
from 0.05% to 2% by weight of at least one antifoaming agent,
from 13% to 97.95% by weight of water, and
from 1% to 20% by weight of said composition ($C_{21}$) as defined in claim 3.

* * * * *